Sept. 6, 1966  E. A. KNOWLTON  3,270,610
SEALED HOLLOW FASTENER MEMBERS
Filed Aug. 20, 1963  2 Sheets-Sheet 1
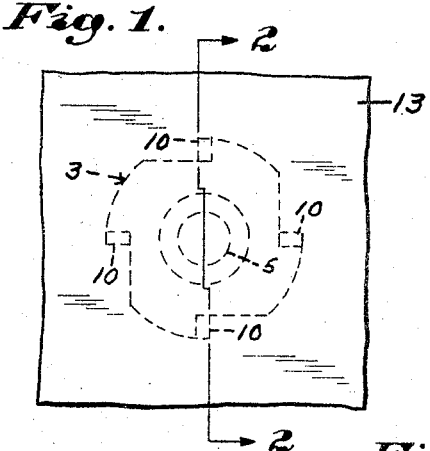
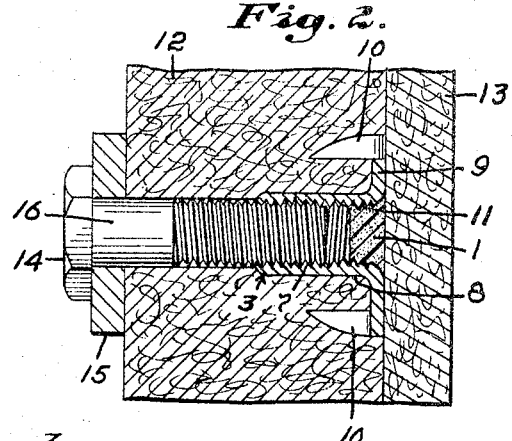
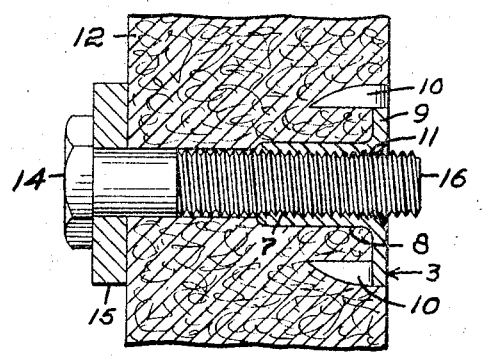
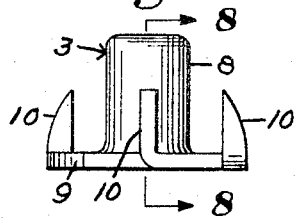
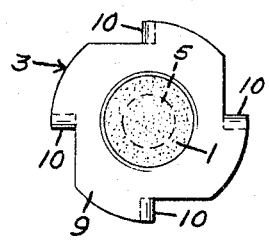
Inventor:
Edward A. Knowlton,
by Walter P. Jones
Atty.

Sept. 6, 1966    E. A. KNOWLTON    3,270,610
SEALED HOLLOW FASTENER MEMBERS
Filed Aug. 20, 1963    2 Sheets-Sheet 2
*Fig. 6.*
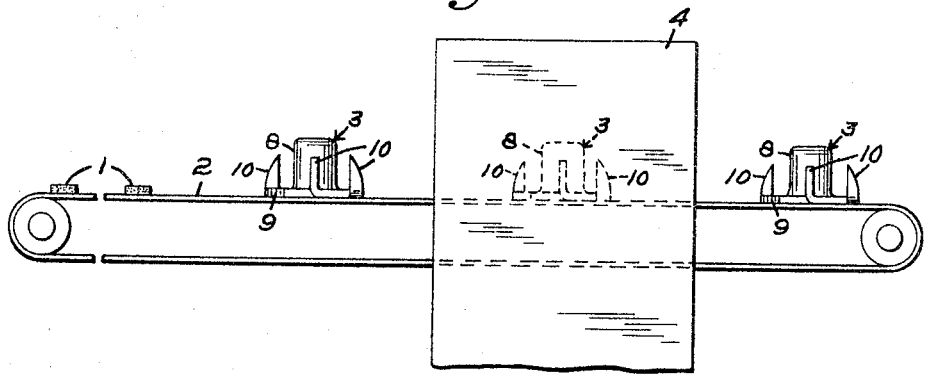
*Fig. 7.*
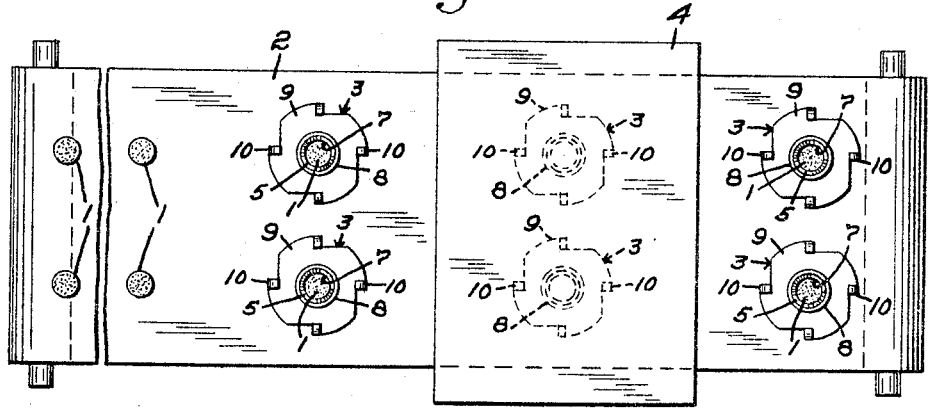
*Fig. 8.*   *Fig. 9.*   *Fig. 10.*
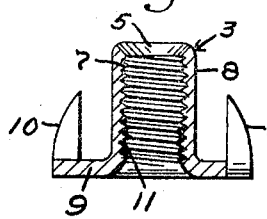 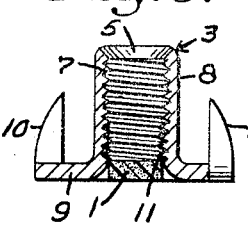 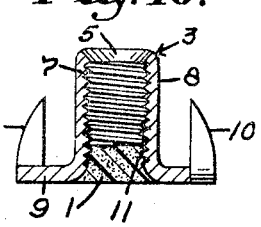
Inventor:
Edward A. Knowlton,
by Walter P. Jones
Atty.

United States Patent Office 3,270,610
Patented Sept. 6, 1966

3,270,610
SEALED HOLLOW FASTENER MEMBERS
Edward A. Knowlton, Winchester, Mass., assignor to United-Carr Incorporated, a corporation of Delaware
Filed Aug. 20, 1963, Ser. No. 303,256
2 Claims. (Cl. 85—32)

This invention generally relates to an improved seal for a threaded bore.

An object of the invention is to provide an effectively sealed female fastener member for applications wherein said fastener member is seated in a structure which is to be subjected to painting, varnishing or coating in particular, by use of a pressurized applicator whereby the sealing element prohibits the coating material from entering into the internal threaded portions of the fastener thus facilitating subsequent insertion and removal of a male fastener element within the female member.

A further object of the invention, one which has been successful commercially, is to provide a sealed female fastener member for use in the manufacture of fiberglass reinforced plastic boats wherein the sealed female fastener member is seated in the basic structure of the boat prior to the application of the plastic coating. The seal thereafter prohibits the plastic from entering the internal portions of the fastener when said plastic coating is applied. It is submitted that putty, rubber, and other pliable fillers heretofore used in similar applications do not effectively withstand the hydraulic pressures incident to such applications as the bond between such fillers and the fastener is relatively weak by comparison to the seal utilized in the instant invention.

With the above and other objects in view, the invention resides in the novel features more explicitly hereinafter set forth.

In the drawings:

FIG. 1 is a plan view of an installation including a sealed fastener;

FIG. 2 is a section taken on line 2—2 of FIG. 1;

FIG. 3 is a view similar to that of FIG. 2 wherein the male member of the fastener has been driven completely through the sealed female member;

FIG. 4 is a side elevation of a female fastener member containing a sealing element;

FIG. 5 is a bottom plan view of the fastener member shown in FIG. 4;

FIG. 6 is a schematic view in side elevation, of an apparatus for implementing the plug sealing of a fastener member;

FIG. 7 is a top plan view of the apparatus shown in FIG. 6;

FIG. 8 is a section of the fastener member on the line 8—8 of FIG. 4, less the sealing element;

FIG. 9 is identical to FIG. 8 with the addition of an unexpanded sealing element; and FIG. 10 is a duplicate of FIG. 9 with the sealing element having been fully expanded.

With reference to the drawings the procedural steps which are followed in implementing the inventive sealing process are simply outlined as follows:

A pellet 1, more fully described hereafter, is placed on the belt 2 of the apparatus shown schematically in FIG. 6, subsequently a fastener member 3 to be sealed is placed over the pellet 1 as best shown in FIG. 7, a primer, more fully described hereafter, having been applied to the fastener member or the pellet. At this point the pellet 1 is fully seated within the internal walls formed by the aperture in the fastener member 3 (FIG. 9).

The belt is then advanced either mechanically or manually. The fastener member containing the pellet is thereby moved into the oven 4 and subjected to heat at a temperature (375° F. has proved satisfactory) necessary to cause expansion of the pellet within the walls of the aperture in the fastener member as best depicted in FIG. 10, thus creating an adhesion between said walls and the external surfaces of the pellet as will hereafter be more fully described. The device is then moved out of the oven 4 by further advancing the belt 2 and allowed to cool. The result achieved is a fully sealed closure formed in the aperture in the fastener member as is best depicted in FIG. 10.

The pellet may be fabricated from any suitable thermo-expansible material which will remain in its expanded state on subsequent cooling. To date, optimum results have been achieved utilizing pellets cut from foam vinyl tape. However, it is anticipated that other materials, for example epoxy, could be utilized successfully.

Likewise, while the pellet 1 is generally circular in configuration it is obvious that it might be cut in the shape of any polygon which would be most adaptable to insertion and expansion in the structure to be sealed.

It would also be well to point out that while the choice in this instance has been to depict an oven 4 with a belt 2 passing through it as a method of supplying the necessary heat to cause expansion of the pellet, heat might well be applied from any suitable external source which the circumstances surrounding the use of the process for affecting the sealing of an aperture might dictate.

In the embodiment of the invention shown in FIGS. 4 and 5 there is depicted a generally tubular fastener member 3 having an aperture 5 extending axially therethrough. The internal walls 7 of the tubular extension 8 formed by the aperture 5 are fully threaded throughout. The flanged portion 9 adjacent one of the terminations of the tubular extension 8 is generally circular in configuration with portions on its outer circumference cut to provide prongs 10 which are formed to extend out of the plane of the flange 9 in the direction of the tubular extension 8 and are generally parallel to the tubular extension 8 as shown in FIG. 4 and form generally 90° angles at their intersection with the flange portion 9.

The threaded portions of the fastener member have been coated with a vinyl resin based adhesive primer (Denflex) 11 (FIGS. 8, 9, and 10). A vinyl foam plug 1 is shown seated completely within the threaded portions of the internal walls 7 of the tubular portion 8 formed by the aperture 5 and expanded by the heating process previously outlined. The external surfaces of the expanded pellet are bonded to the primer coated threaded portions such that the adhesion of those surfaces of the pellet so bonded with the surfaces of the threads is greater than the cohesion of the pellet 1 within itself. Thus the tubular portion 8 of the fastener member 3 has an internal sealed closure from one of its extremities through the depth of the expanded pellet. With reference to the primer coating 11 (FIGS. 8, 9, and 10) it should be understood that the primer serves only to accelerate and enhance the bonding of the substance of the pellet 1 with the threaded surfaces of the wall 7 upon application of heat and expansion of the pellet 1. In other words, the utilization or non-utilization of the primer 11 is contingent on the type of expansible material utilized. If said material possesses properties which render it readily bondable to the material of the structure being sealed, the user may forego the use of the primer 11. Conversely, if the pellet's inherent properties are not readily conducive to adhesion with the material of the structure to be sealed, the use of the primer 11 becomes imperative.

FIGS. 1, 2, and 3 depict proposed applications of the invention. FIG. 1 is a plan view of a structure 12, for instance the hull of a boat embodying the invention. FIG. 2 is a section taken along line 2—2 of FIG. 1. In this application a pronged 10 fully threaded female fastener member 3 embodying the applicant's sealing device 1 has been seated in the structure 12 e.g., externally in the hull of a boat. A coating 13, e.g., fiber glass reinforced plastic, has then been applied to the external surface of the structure of hull 12. The sealing device prevents the entrance of any of the coating substance 13 into or onto the threaded portions of the female fastener member 3. Thus, as shown in FIG. 2, a mating male fastener member 14 may readily be engaged with the threaded portions of the female fastener member 3 from the opposite side of the structure 12, or internal side of the hull as it were, for purposes of fastening another structure 15 to that side of the structure or hull 12.

FIG. 3 discloses a further application of the invention wherein the male fastener member 14 is engaged with the sealed female fastener member 3 which is seated in support 12. In this instance, however, the shank portion 16 of the male member 14 has been driven completely through the threaded aperture 5 of the female fastener member 3. The action of the shank portion 16 passing through the threaded aperture 5 punctures the sealing element 1 shearing away a portion of the sealing element 1 as it passes through it. The remaining portions of the sealing element 1 are compressed between the mating threads of the male and female fastener members. Thus the sealing effect is maintained and moisture is prohibited from entering between the mating threaded portions of the fastener members through the aperture 5 adjacent the flange 9 of the female member 3.

With reference to the foregoing description it is to be understood that what has been disclosed therein represents embodiments of the invention which are to be construed as illustrative rather than restrictive or limiting in nature, e.g., the sealing element might be employed internally in an unthreaded structure, and that the invention is best described by the following claims.

I claim:

1. A sealed fastener member comprised of a tubular extension having an aperture throughout and internal walls formed by said aperture which are threaded and primer coated and a cured thermally-expanded foam vinyl pellet seated within and bonded to the internal walls of said tubular extension sealing said fastener member.

2. A nut having an internal threaded wall defining an aperture therein, said aperture being sealed by a thermally expanded foam plastic pellet seated in said aperture and bonded to said threaded wall.

References Cited by the Examiner

UNITED STATES PATENTS

| | | |
|---|---|---|
| 2,027,962 | 1/1936 | Currie. |
| 2,421,105 | 5/1947 | Warren _____ 151—7 |
| 2,506,477 | 5/1950 | Warren _____ 151—7 |
| 2,697,873 | 12/1954 | Cooke. |
| 2,826,222 | 3/1958 | Case _____ 138—96 |
| 2,977,993 | 4/1961 | Scherer _____ 138—96 |
| 3,041,229 | 6/1962 | Moisson _____ 264—45 X |
| 3,121,129 | 2/1964 | Knowlton _____ 264—45 |
| 3,170,967 | 2/1965 | Williams et al. _____ 264—45 |

CHARLIE T. MOON, *Primary Examiner.*